(12) United States Patent
Hazra et al.

(10) Patent No.: US 6,594,313 B1
(45) Date of Patent: Jul. 15, 2003

(54) INCREASED VIDEO PLAYBACK FRAMERATE IN LOW BIT-RATE VIDEO APPLICATIONS

(75) Inventors: Rajeeb Hazra, Beaverton, OR (US); Arlene Kasai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/221,666

(22) Filed: Dec. 23, 1998

(51) Int. Cl.[7] .................................. H04N 7/18
(52) U.S. Cl. ..................... 375/240.16; 375/240.14; 375/240.13; 375/240.26
(58) Field of Search ................. 375/240.12–240.17, 375/240.25–240.29

(56) References Cited

U.S. PATENT DOCUMENTS

| | | | |
|---|---|---|---|
| 5,384,912 A | 1/1995 | Ogrinc et al. ............. | 395/164 |
| 5,995,154 A * | 11/1999 | Heimburger ............... | 348/448 |
| 6,192,079 B1 * | 2/2001 | Sharma et al. ........... | 375/240.16 |
| 6,275,532 B1 * | 8/2001 | Hibi et al. ................ | 375/240.17 |
| 6,307,887 B1 * | 10/2001 | Gabriel .................... | 375/240.16 |
| 6,404,817 B1 * | 6/2002 | Saha et al. ............... | 375/240.27 |
| 6,430,316 B1 * | 8/2002 | Wilkinson ................. | 382/236 |
| 6,459,813 B1 * | 10/2002 | Boon ....................... | 382/238 |

FOREIGN PATENT DOCUMENTS

| | | | |
|---|---|---|---|
| EP | 0386805 | 9/1990 | H04N/7/12 |
| GB | 2265783 | 10/1993 | H04N/5/14 |
| WO | 99/57906 | 11/1999 | H04N/7/18 |

OTHER PUBLICATIONS

Bergmann, H.C., "Motion Adaptive Frame Interpolation", *Proceedings of the Zurich Seminar on Digital Communications, D*, 21–25, (Mar. 6–8, 1984).

Cafforio, C., et al., "Motion Compensated Image Interpolation", *IEEE Transactions on Communications, 38*, 215–222, (Feb. 1990).

Mori, L., et al., "Motion Compensated Interpolation Using Foreground/Background Segmentation", *Proceedings of the International Conference*, Florence, Italy, 379–384, (Sep. 1991).

Schweitzer, H., et al., "Interpolating DCT Representation of Digital Video Over Time", *Proceedings SPIE– The International Society for Optical Engineering, 2421*, 15–22, (Feb. 9–10,1995).

Thoma, R., et al., "Motion Compensating Interpolation Considering Covered and Uncovered Background", *Image Communications, 1*, 191–212, (1989).

Wong, C., et al., "Fast Motion Compensated Temporal Interpolation for Video", *SPIE, 2501*, 1108–1118, (1995).

Wong, C., et al., "Modified Motion Compensated Temporal Frame Interpolation for Very Low Bit Rate Video", *The 1996 IEEE International Conference on Acoustics, Speech, and Signal Processing Conference Proceedings*, Atlanta, Georgia, 2327–2330, (May 7–10, 1996).

* cited by examiner

Primary Examiner—Andy Rao
(74) Attorney, Agent, or Firm—Schwegman, Lundberg, Woessner & Kluth, P.A.

(57) ABSTRACT

A method comprising selecting a number of blocks of a frame pair and synthesizing an interpolated frame based on those selected blocks of the frame pair. Additionally, the synthesis of the interpolated frame is aborted upon determining the interpolated frame has an unacceptable quality.

42 Claims, 13 Drawing Sheets

INCREASED VIDEO PLAYBACK FRAMERATE IN LOW BIT-RATE VIDEO APPLICATIONS

FIELD

The present invention relates to multimedia applications and, in particular, to displaying video applications at an increased video framerate.

BACKGROUND

While the transmission bandwidth rate across computer networks continues to grow, the amount of data being transmitted is growing even faster. Computer users desire to transmit and receive more data in an equivalent or lesser time frame. The current bandwidth constraints limits this ability to receive more data in less time as data and time, generally, are inversely related in a computer networking environment. One particular type of data being transmitted across the various computer networks is a video signal represented by a series of frames. The limits on bandwidth also limit the frame rate of a video signal across a network which in turn lowers the temporal picture quality of the video signal being produced at the receiving end.

Applying real-time frame interpolation to a video signal increases the playback frame rate of the signal which in turn provides a better quality picture. Without requiring an increase in the network bandwidth, frame interpolation provides this increase in the frame rate of a video signal by inserting new frames between the frames received across the network. Applying current real-time frame interpolation techniques on a compressed video signal, however, introduces significant interpolation artifacts into the video sequence. Therefore, for these and other reasons there is a need for the present invention.

SUMMARY

In one embodiment, a method includes selecting a number of blocks of a frame pair and synthesizing an interpolated frame based on those selected blocks of the frame pair. Additionally, the synthesis of the interpolated frame is aborted upon determining the interpolated frame has an unacceptable quality.

In another embodiment, a method includes selecting a block size based on a level of activity for a current frame and a previous frame and synthesizing an interpolated frame based on the selected block size of these two frames.

In another embodiment, a method includes maintaining a number of lists, wherein each list contains a current winning block, for a number of interpolated blocks of an interpolated frame for determining a best-matched block from a frame pair for each interpolated block. Additionally, the best-matched block for each interpolated block is selected from the current winning block for each list based on an error criterion and an overlap criterion. The interpolated frame is synthesized based on the best-matched block for each interpolated block.

In another embodiment, a method includes selecting a zero motion vector for a given pixel in an interpolated frame upon determining a current pixel in a current frame corresponding to the given pixel in the interpolated frame is classified as covered or uncovered. The interpolated frame is synthesized based on selecting the zero motion vector for the given pixel in the interpolated frame upon determining the current pixel in the current frame corresponding to the given pixel in the interpolated frame is classified as covered or uncovered.

In another embodiment, a method comprises classifying a number of pixels in a current frame into one of a number of different pixel classifications for synthesis of an interpolated frame. The synthesis of the interpolated frame is aborted and a previous frame is repeated upon determining the interpolated frame has an unacceptable quality based on the classifying of the number of pixels in the current frame.

In another embodiment, a method includes selecting a best motion vector for each of a number of blocks for a hypothetical interpolated frame situated temporally in between a current frame and a previous frame. The best motion vector is scaled for each of the number of blocks for the hypothetical interpolated frame for a number of interpolated frames a relative distance of the number of interpolated frames from the current frame. The number of interpolated frames are synthesized based on the best motion vector for each block within the number of interpolated frames.

DETAILED DESCRIPTION

Embodiments of the invention include computerized systems, methods, computers, and media of varying scope. In addition to the aspects and advantages of the present invention described in this summary, further aspects and advantages of this invention will become apparent by reference to the drawings and by reading the detailed description that follows.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Figure 1:
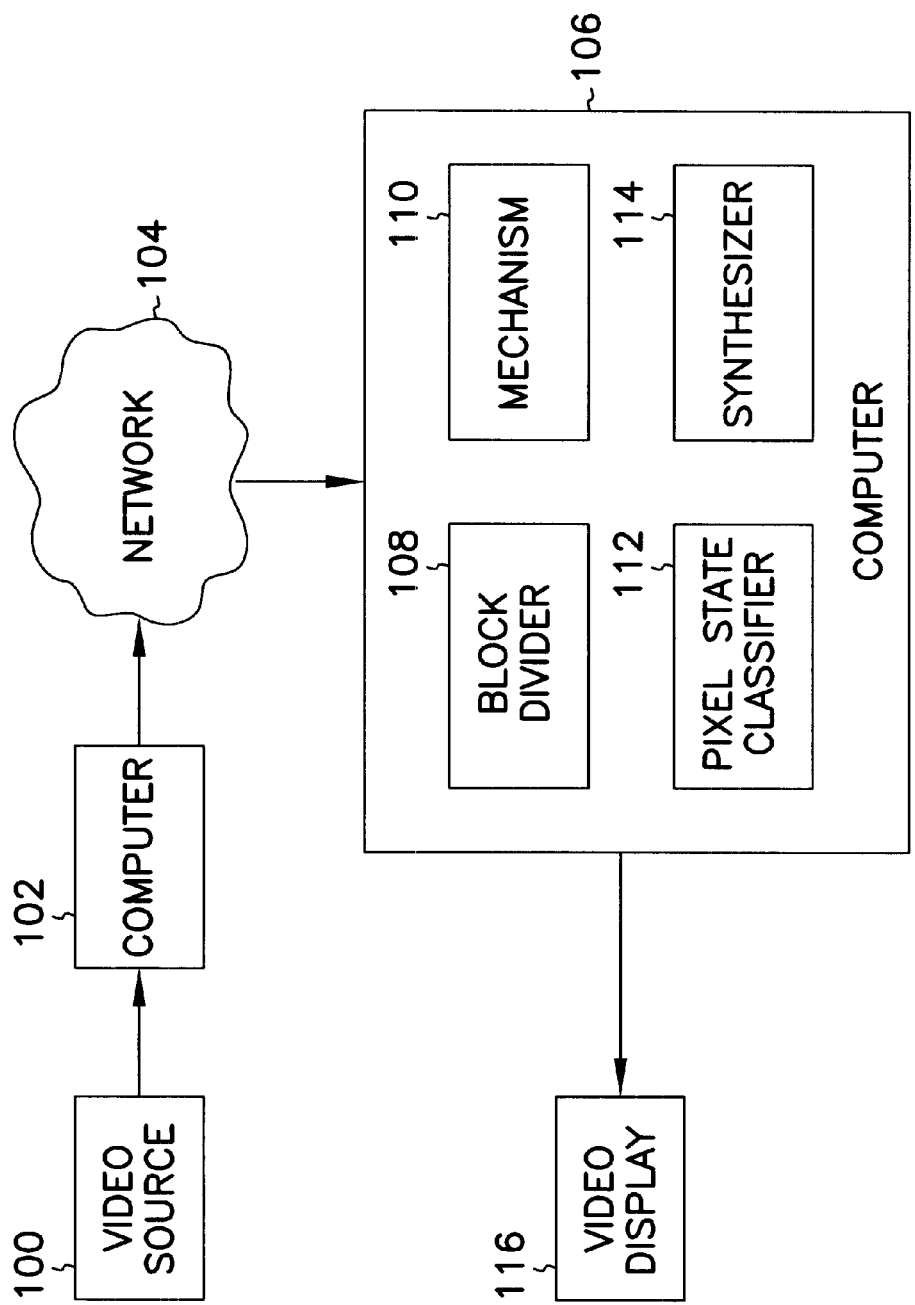
FIG. 1 is a block diagram of a system in accordance with an embodiment of the invention.

Referring first to FIG. 1, a block diagram of a system according to one embodiment of the invention is shown. The system of FIG. 1 includes video source 100, computer 102, network 104, computer 106, block divider 108, mechanism 110, pixel state classifier 112, synthesizer 114 and video display 116. As shown, block divider 108, mechanism 110, pixel state classifier 112 and synthesizer 114 are desirably a part of computer 106, although the invention is not so limited. In such an embodiment, block divider 108, mechanism 110, pixel state classifier 112 and synthesizer 114 are all desirably computer programs on computer 106—i.e., programs (viz., a block divider program, a mechanism program, a pixel state classifier program and a synthesizer program) executed by a processor of the computer from a computer-readable medium such as a memory thereof. Computer 106 also desirably includes an operating system, not shown in FIG. 1, within which and in conjunction with which the programs run, as can be appreciated by those within the art.

Video source 100 generates multiple frames of a video sequence. In one embodiment, video source 100 includes a video camera to generate the multiple frames. Video source 100 is operatively coupled to computer 102. Computer 102 receives the multiple frames of a video sequence from video source 100 and encodes the frames. In one embodiment the frames are encoded using data compression algorithms known in the art. Computer 102 is operatively coupled to network 104 which in turn is operatively coupled to computer 106. Network 104 propagates the multiple frames from computer 102 to computer 106. In one embodiment the network is the Internet. Computer 106 receives the multiple frames from network 104 and generates an interpolated frame between two consecutive frames in the video sequence.

Figure 2:
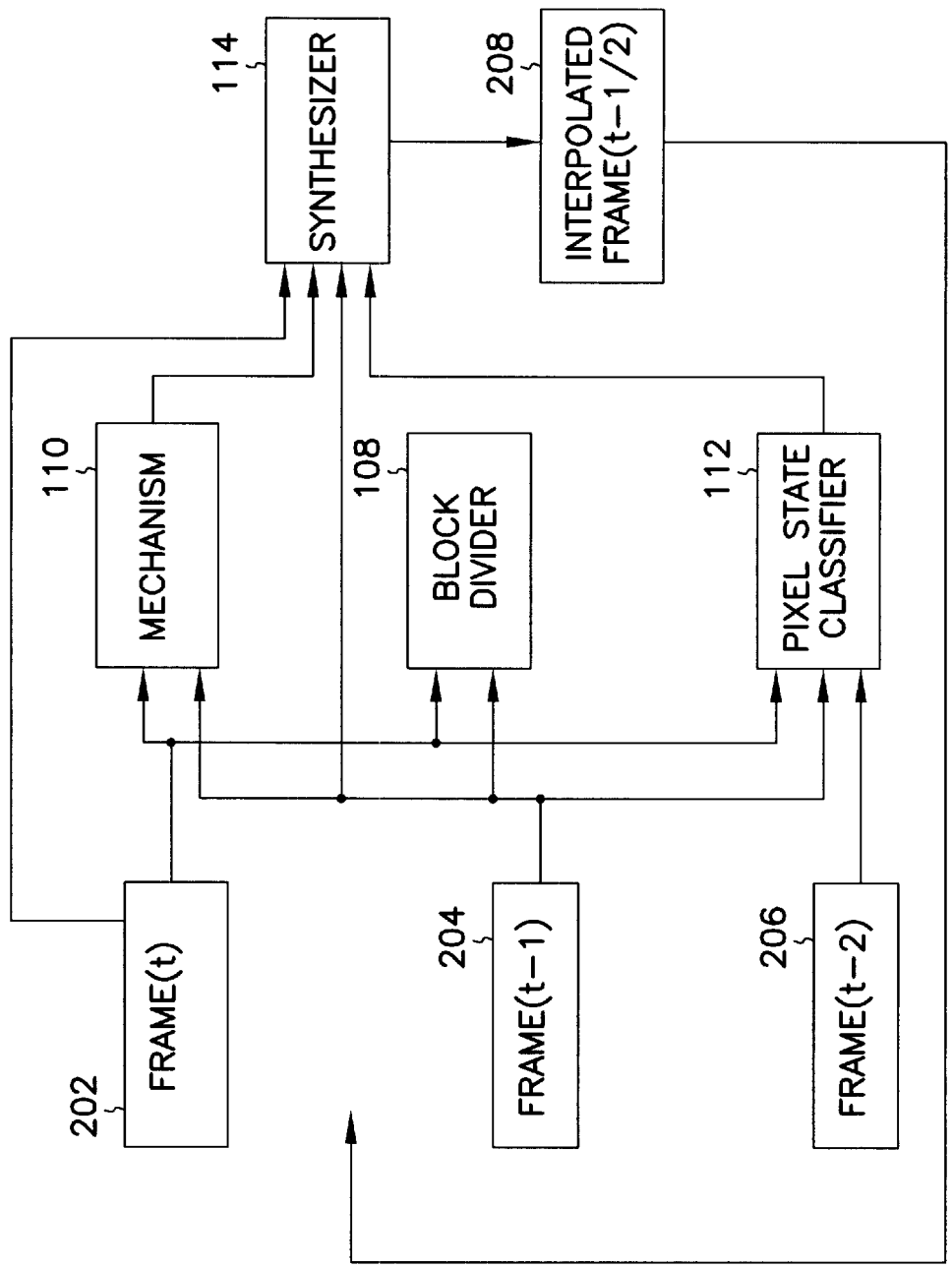
FIG. 2 is a block diagram of frame interpolation in accordance with an embodiment of the invention.

More specifically as shown in FIG. 2, block divider 108, residing on computer 106, breaks two consecutive frames, frame(t) 202 (the current frame) and frame(t−1) 204 (the previous frame) along with interpolated frame(t−½) 208 into blocks. Mechanism 110 takes each block of interpolated frame(t−½) 208 and determines the best motion vector for each block based on the two corresponding consecutive frames (frame(t) 202 and frame(t−1) 204) between which interpolated frame(t−½) 208 will reside.

Pixel state classifier 112 takes a set of three frames—frame(t) 202, frame(t−1) 204 and frame(t−2) 206 (the previous to previous frame) and characterizes each pixel in the current frame. In one embodiment each pixel is classified as being in one of four states—moving, stationary, covered background and uncovered background.

Synthesizer 114 receives the best motion vector for each block in the interpolated frame(t−½) 208 from mechanism 110 and the pixel state classification for each pixel in frame(t) 202 from pixel state classifier 112 and creates interpolated frame(t−½) 208 by synthesizing on a block-by-block basis. After the generation of interpolated frame(t−½) 208 by computer 106, video display 116 which is operatively coupled to computer 106 receives and displays frame(t) 202 and frame(t−1) 204 along with interpolated frame(t−½) 208. In one embodiment, video display 116 includes a computer monitor or television.

Figure 3:
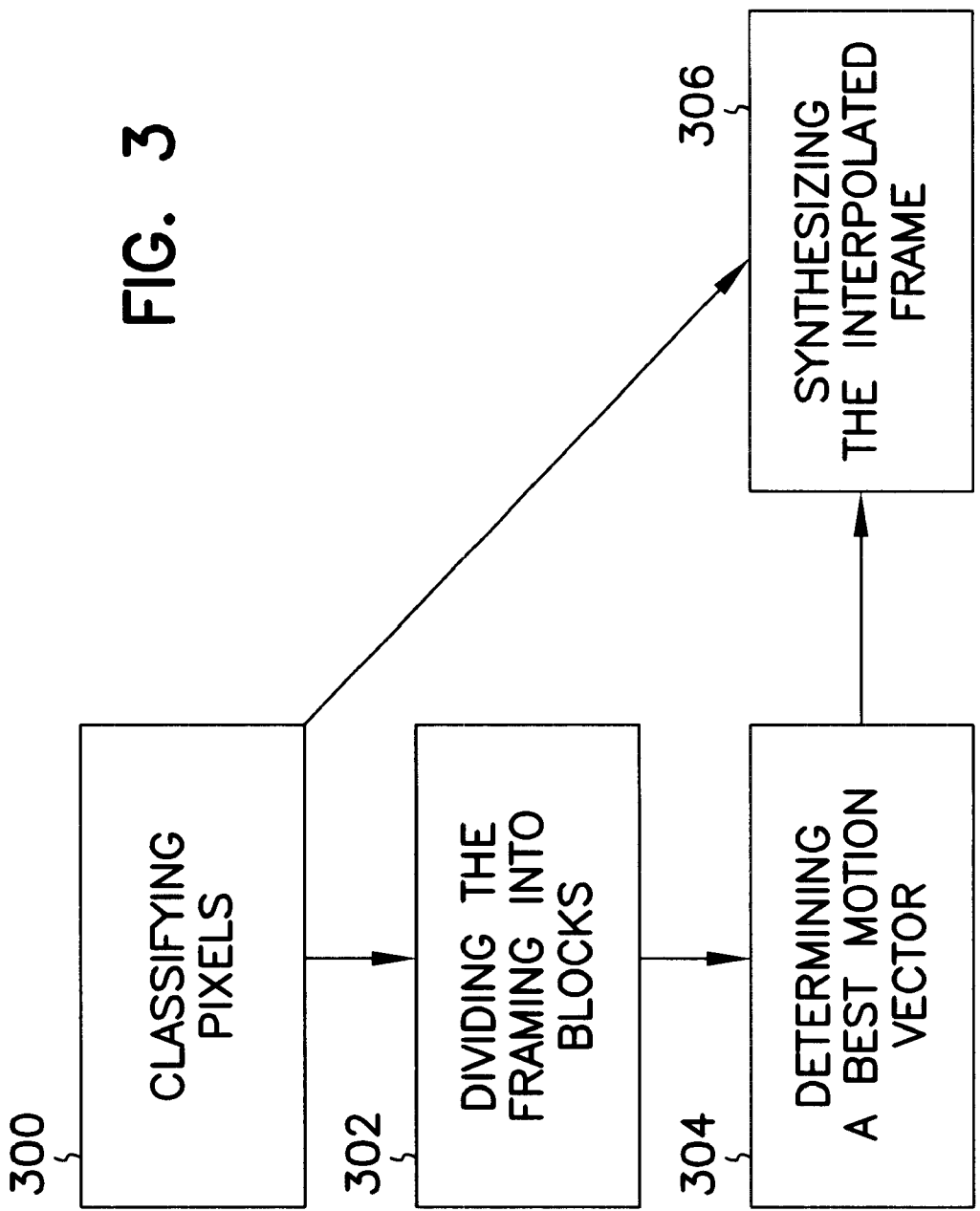
FIG. 3 is a flowchart of a method in accordance with an embodiment of the invention.

Referring next to FIG. 3, a flowchart of a method in accordance with an embodiment of the invention is shown. The method is desirably realized at least in part as one or more programs running on a computer—that is, as a program executed from a computer-readable medium such as a memory by a processor of a computer. The programs are desirably storable on a computer-readable medium such as a floppy disk or a CD-ROM (Compact Disk-Read Only Memory), for distribution and installation and execution on another (suitably equipped) computer.

In block 300, all the pixels in the current frame are classified into different pixel categories. In one embodiment, the categories include moving, stationary, covered background and uncovered background. In block 302, the current and the previous frames from the video sequence coming in from network 104 along with the interpolated frame between these two frames are divided into blocks. In block 304, a best motion vector is selected for each block of the interpolated frame. In block 306 based on the pixel state classification of the pixels in the current frame along with the best motion vector for the block of the corresponding interpolated frame, the interpolated frame is synthesized on a block-by-block basis.

In one embodiment, when dividing the frames into blocks in block 302, the blocks are dynamically sized changing on a per frame basis and adapting to the level of activity for the frame pair from which the interpolated frame is synthesized. The advantage of using such an adaptive block size is that the resolution of the motion field generated by motion estimation can be changed to account for both large and small amounts of motion.

In one embodiment when using dynamic block size selection, block 302 uses the pixel state classification from block 300 to determine the block size for a set of interpolated frames. Initially a block size of N×N is chosen (N=16 for Common Intermediate Format (CIF) and, in one embodiment, equals 32 for larger video formats) and tessellates (i.e., divides) a classification map of the image into blocks of this size. The classification map for an image contains a state (chosen from one of four classifications (moving, stationary, covered or uncovered)), for each pixel within the image. For each block in this classification map, the relative portions of pixels that belong to a certain class are computed. The number of blocks that have a single class of pixels in excess of $P_1$% of the total number of pixels in the block is then computed. In one embodiment $P_1$=75. If the proportion of such homogeneous blocks in the classification map is greater than a pre-defined percentage, $P_2$, then N is selected as the block size for motion estimation. Otherwise, N is divided by 2 and the process is repeated until a value of N is selected or N falls below a certain minimum value.

In one embodiment, this minimum value equals eight because using smaller block sizes results in the well-known motion field instability effect and requires the use of computationally expensive field regularization techniques to correct the instability.

In one embodiment, the block selection process chooses a single block size for an entire frame during one interpolation process. Having a single block size for an entire frame provides the advantage of lowering the complexity of the motion estimation and the motion compensation tasks, as compared to an embodiment where the block size selection is allowed to change from block to block in a single frame.

Figure 4:
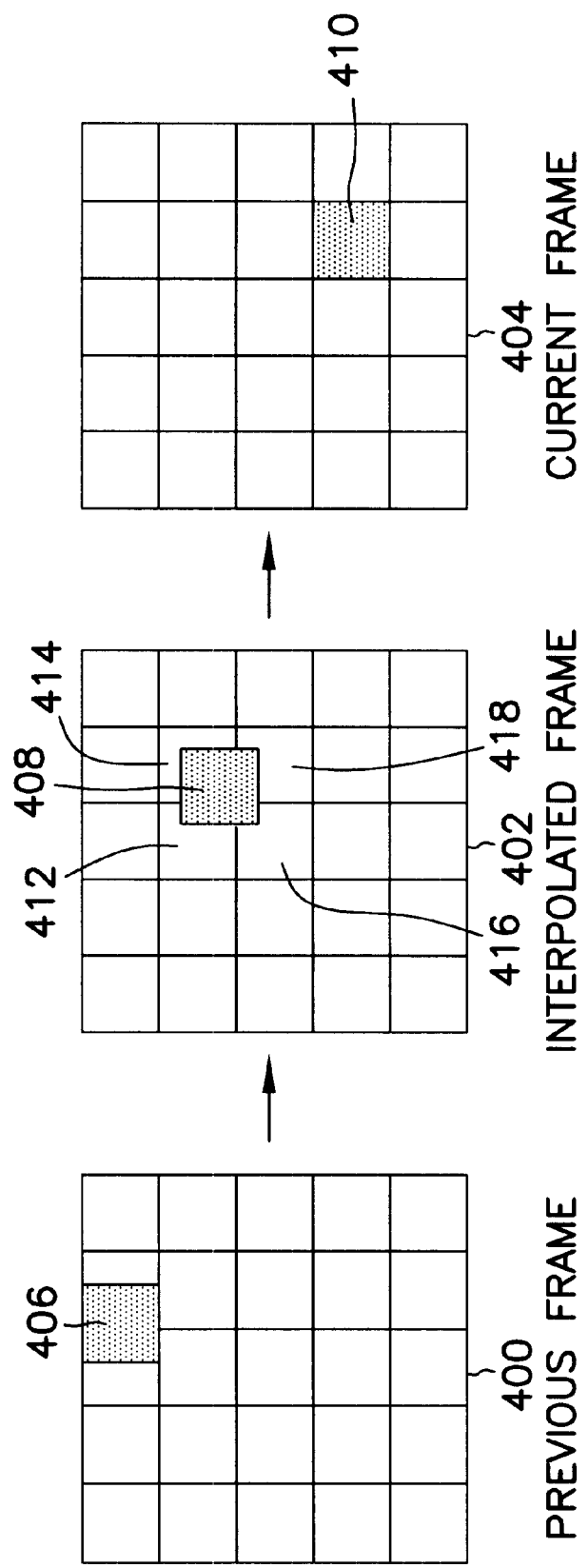
FIG. 4 is a diagram of the corresponding blocks for a previous frame, an interpolated frame and a current frame in accordance with an embodiment of the invention.

An embodiment of block 304 of FIG. 3 for determining the best motion vector for each block of the interpolated frame is shown in FIGS. 4, 5, 6, 7 and 8. For determining the best motion vector, this embodiment provides block motion estimation using both forward and backward block motion estimation along with the zero motion vector. FIG. 4 demonstrates the participating frames along with their blocks used in determining the best motion vector. For each non-stationary block, if ($mv_x$, $mv_y$) denotes the best motion vector (corresponding to block 408), then by assuming linear translational motion, block 408 should appear at ($x+mv_x/2$, $y+mv_y/2$) in interpolated frame 402. In general, block 408 does not fit exactly into the grid block in interpolated frame 402. Instead, it would cover four N×N blocks, 412, 414, 416 and 418. In the forward motion estimation example, block 406 is the best-matched block in previous frame 400 corresponding to block 410 in current frame 404. In interpolated frame 402, the projection covers parts of four blocks 412, 414, 416 and 418; the amount of overlap is not necessarily the same for each of the four affected blocks.

Figure 5:
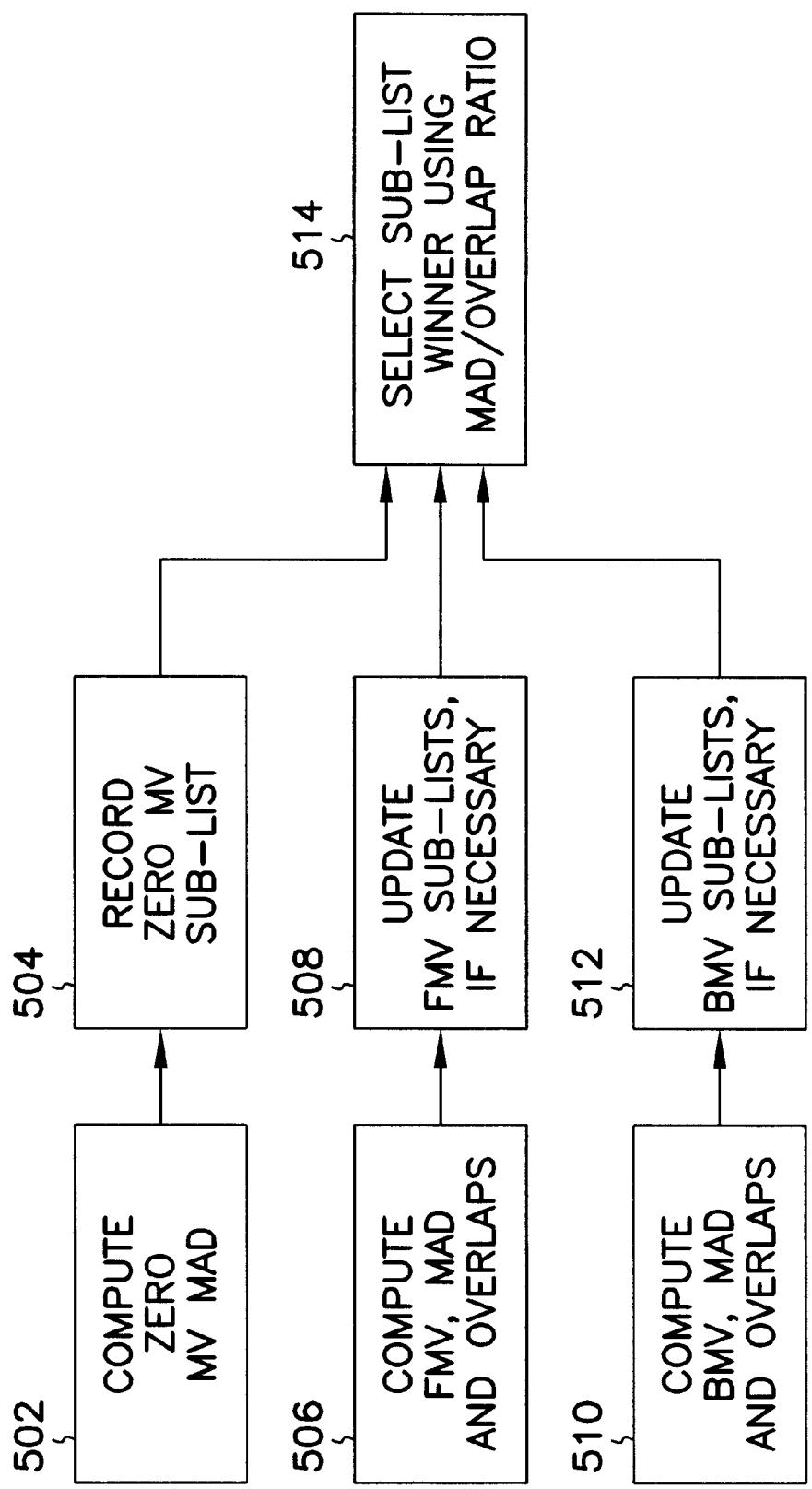
FIG. 5 is a flowchart of a method for block motion estimation in accordance with an embodiment of the invention.

In FIG. 5 for each block in the interpolated frame, three lists of motion vector candidates (i.e., the candidate lists) are created and the motion vector(s) that result in the block being partially or fully covered by motion projection are added to the lists. There is a list for the zero motion vector, the forward motion vector and the backward motion vector. Each list has only one element—the current winning motion vector in that category. In block 502, the zero motion vector's mean absolute difference (MAD) is computed and recorded in the zero motion vector candidate list in block 504. In block 506 and block 510, forward and backward motion vectors along with their corresponding MAD and overlap are computed. In block 508 and block 512, as forward and backward motion estimation are performed for each block, the motion vector lists are updated, if necessary, using the maximum overlap criterion in block 508 and block 512. In block 514, a winning motion vector is selected for each of the three lists (the zero motion vector list, the forward motion vector list and the backward motion vector list).

Figure 6:
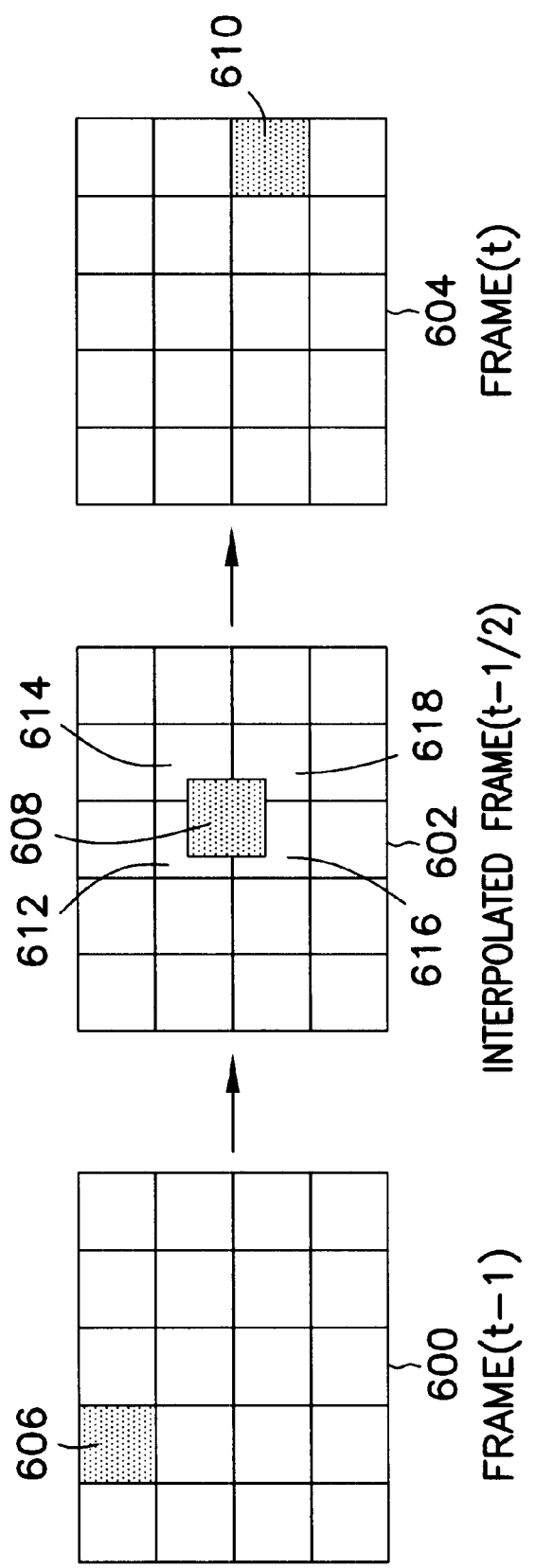
FIG. 6 is a diagram of the corresponding blocks for a previous frame, an interpolated frame and a current frame for a first iteration for forward motion estimation in determining the best motion vector for blocks of the interpolated frame.
Figure 7:
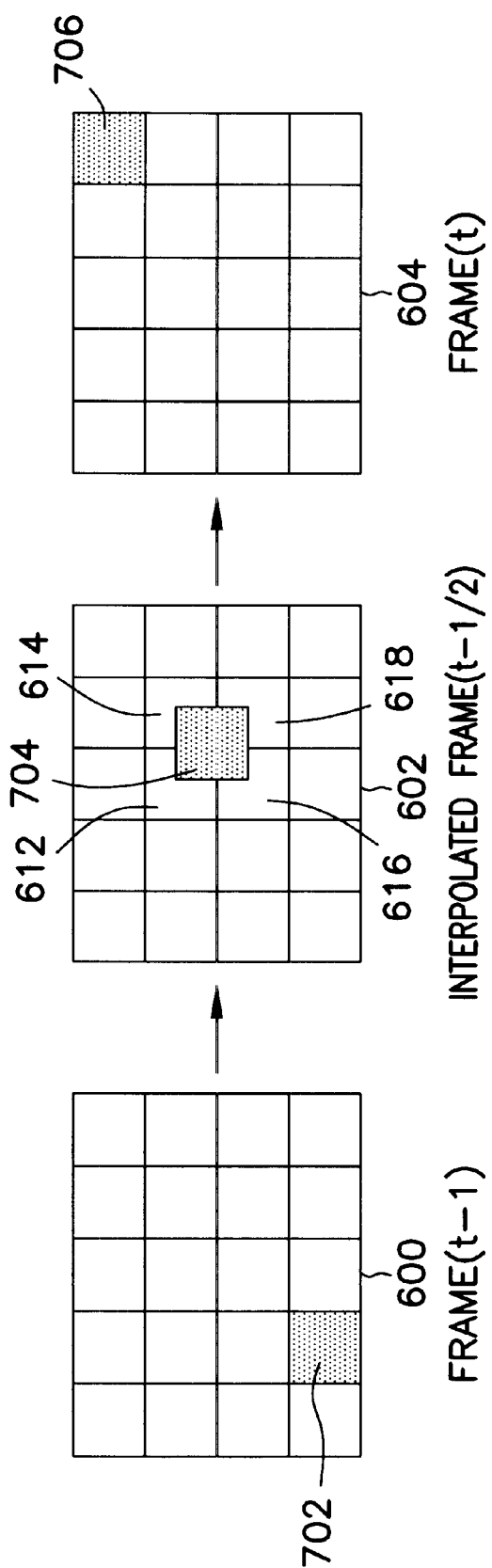
FIG. 7 is a diagram of the corresponding blocks for a previous frame, an interpolated frame and a current frame for a second iteration for forward motion estimation in determining the best motion vector for blocks of the interpolated frame.

In FIGS. 6 and 7, two forward motion vector candidates are found to determine the best motion vector for blocks 612, 614, 616 and 618 of interpolated frame(t−½) 602. For the sake of clarity, the numbering is consistent for those portions of FIGS. 6 and 7 which are the same. The frames are divided into blocks. In FIG. 6, block 606 of frame(t−1) 602 is found to be the best-matched block for block 610 of frame(t) 604. Therefore motion vectors are created based on linear translational motion between blocks 606 and 610. Block 608 for interpolated frame(t−½) 602 is formed based on the motion vectors between blocks 606 and 610. However, block 608 does not perfectly fit into any of the pre-divided blocks of interpolated frame(t−½) 602; rather block 608 partially covers (i.e., overlaps) blocks 612, 614, 616 and 618 of interpolated frame(t−½) 602. Therefore the motion vectors associated with block 608 are placed on the candidate lists for blocks 612, 614, 616 and 618.

Similarly in FIG. 7, block 702 of frame(t−1) 600 is found to be the best-matched block for block 706 of frame(t) 604. Motion vectors are created based on linear translational motion between blocks 702 and 706. Block 704 for interpolated frame(t−½) 602 is formed based on the motion vectors between blocks 702 and 706. Like block 608, block 704 does not perfectly fit into any of the pre-divided blocks of interpolated frame(t−½) 602; rather block 704 partially covers (i.e., overlaps) blocks 612, 614, 616 and 618 of interpolated frame(t−½) 602. Therefore the motion vectors associated with block 703 are placed on the candidate lists for blocks 612, 614, 616 and 618.

Based on these two forward motion vector candidates, for block 612 of interpolated frame(t−½) 602, block 608 has greater overlap into block 612 than block 704 and therefore block 608 is the current winning forward motion vector candidate for block 612. Similarly for block 614 of interpolated frame(t−½) 602, block 704 has greater overlap into block 614 than block 608 and therefore block 704 is the current winning forward motion vector candidate for block 614.

Figure 8:
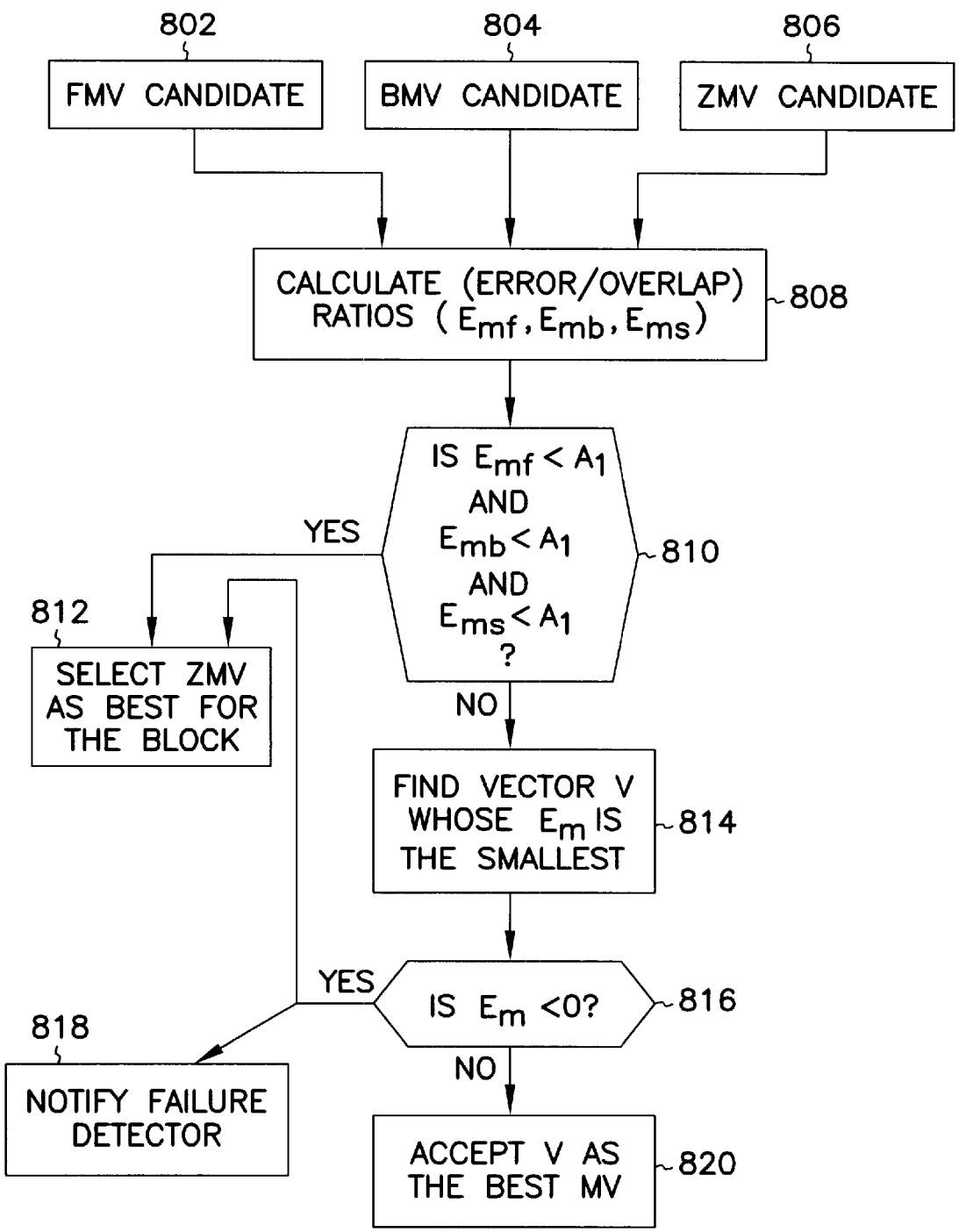
FIG. 8 is a flowchart of a method for block motion estimation in accordance with another embodiment of the invention.

In FIG. 5, block 514 is performed in one embodiment by the method of FIG. 8, as the final motion vector is selected from one of the candidate lists. In FIG. 8 in block 808, the selection criterion from.among the three candidates, Forward Motion Vector (FMV) Candidate 802, Backward Motion Vector (BMV) Candidate 804 and Zero Motion Vector (ZMV) Candidate 806, from the candidate lists uses both the block matching error (MAD or the Sum of Absolute Difference (SAD)) and the overlap to choose the best motion vector. The rationale for using the block matching error is to penalize unreliable motion vectors even though they may result in a large overlap. In particular, the selected motion vector is one for which the ratio, $E_m$, of the block matching error to the overlap is the smallest among the three candidates. In block 810, the determination is made as to whether all three ratios are smaller than a predetermined threshold, $A_1$. Upon determining all three ratios are smaller than a predetermined threshold, block 812 selects the candidate with the largest overlap, the zero motion vector. In one embodiment $A_1$ is equal to 1.0. Upon determining all three ratios are not smaller than the predetermined threshold $A_1$, in block 814 the vector with the smallest $E_m$ ratio is selected.

Moreover, in block 816, even if the ratios result in either the forward or the backward motion vector being selected and the overlap for the chosen motion vector is less than a pre-defined threshold, O, the zero motion vector is again chosen. In one embodiment, O ranges from 50–60% of the block size used in the motion estimation. Additionally in block 818, if in block 816 the zero motion vector is substituted for either the forward or backward motion vector, the failure detector process is notified. Failure detection will be more fully explained below. In another embodiment, the backward motion vector estimation is eliminated, thereby only using the zero motion vector and the forward motion vector estimation in the block motion estimation. In block 818, if the $E_m$ ratio selected is greater than the pre-defined threshold, O, the associated motion vector is accepted as the best motion vector.

In another embodiment in the synthesizing of the interpolated frame in block 306 of FIG. 3, for those pixels that are classified as being either covered or uncovered, a zero motion vector is used instead of the actual motion vector associated with that particular interpolation block. This provides for a reduction of artifacts along the edges of moving objects because the covered and uncovered regions, by definition, are local scene changes and therefore cannot be compensated using block matching techniques. Moreover, a low pass filter (e.g., a 2-D 1-2-1 filter) can be used along the edges of covered regions to smooth the edges' artifacts.

The ability to detect interpolated frames with significant artifacts provides for an overall better perception of video quality. Without this ability, only a few badly interpolated frames color the user's perception of video quality for an entire sequence that for the most part has been successfully interpolated. Detecting these badly interpolated frames and dropping them from the sequence allows for significant frame-rate improvement without a perceptible loss in spatial quality due to the presence of artifacts. Interpolation failure is inevitable since non-translational motion such as rotation and object deformation can never be completely captured by block-based methods, thereby requiring some type of failure prediction and detection to be an integral part of frame interpolation.

Figure 9:
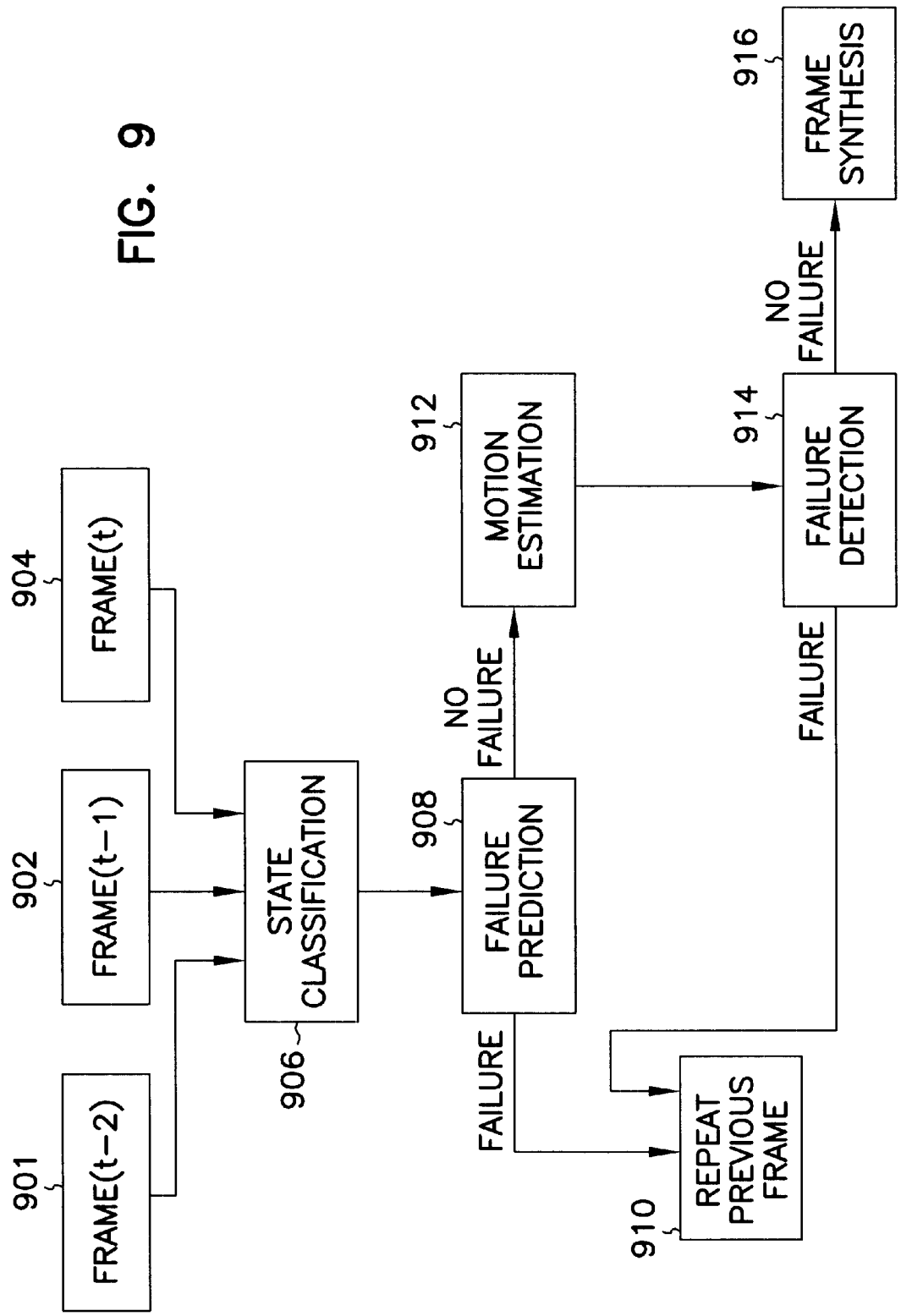
FIG. 9 is a flowchart of a method for failure prediction and detection in accordance with an embodiment of the invention.

In one embodiment seen in FIG. 9, failure prediction and failure detection are incorporated into the interpolation process. Failure prediction allows the interpolation process to abort early, thereby avoiding some of the computationally expensive tasks such as motion estimation for an interpolated frame that will be subsequently judged to be unacceptable. In block 906, taking as input frame(t) 904 (the current frame), frame(t−1) 902 (the previous frame) and frame(t−2) 901 (the previous to previous frame), the classification map is tessellated using the selected block size. In block 908 for each block in frame(t) 904, the relative portions of covered and uncovered pixels are computed. Upon determining the sum of these proportions exceeds a predetermined threshold, L, the block is marked as being suspect. The rationale is that covered and uncovered regions cannot be motion compensated well and usually result in artifacts around the periphery of moving objects. After all the blocks in the classification map have been processed, upon determining the number of blocks for the current frame marked as suspect exceed a predetermined threshold, in block 910 the previous frame is repeated.

Prediction is usually only an early indicator of possible failure and needs to be used in conjunction with failure detection. After motion estimation in block 912 in block 914, failure detection uses the number of non-stationary blocks that have been forced to use the zero motion vector as a consequence of the overlap ratio being smaller than the predetermined threshold from block 818 in FIG. 8 described above. Upon determining the number of such blocks exceeds a predetermined proportion of all the blocks in the interpolated frame, in block 910 the frame is rejected and the previous frame is repeated. Upon determining, however, that such number of blocks have not exceeded a predetermined proportion, the synthesis of block 916, which is the same as block 306 in FIG. 3, is performed.

Figure 10:
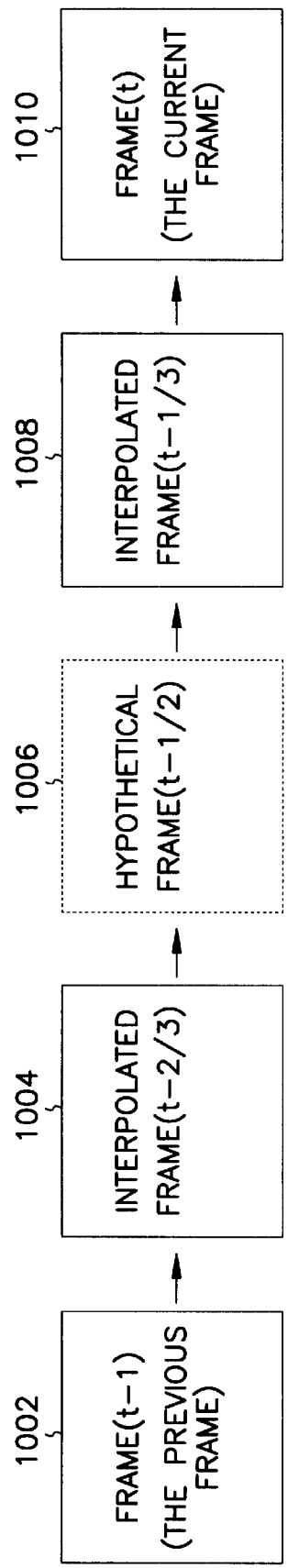
FIG. 10 is a diagram of a previous frame, multiple interpolated frames and a current frame in describing multiple frame interpolation in accordance with an embodiment of the invention.

In FIG. 10, another embodiment is demonstrated wherein the block motion estimator is extended to synthesize multiple interpolated frames between two consecutive frames. Two frames, frame(t−$\frac{2}{3}$) 1004 and frame (t−$\frac{1}{3}$) 1008, are interpolated between the previous frame, frame(t−1) 1002, and the current frame, frame(t) 1010. Hypothetical interpolated frame(t−$\frac{1}{2}$) 1006 is situated temporally in between frame(t−1) 1002 and frame(t) 1010. A single candidate list for each block in hypothetical interpolated frame(t−$\frac{1}{2}$) 1006 is created using the zero motion vector and forward and backward block motion vectors. The best motion vector from among the three candidate lists for each block of hypothetical interpolated frame(t−$\frac{1}{2}$) 1006 is then chosen as described previously in conjunction with FIGS. 4, 5, 6, 7 and 8.

To synthesize each block in each of the actual interpolated frames, frame(t−$\frac{2}{3}$) 1004 and frame (t−$\frac{1}{3}$) 1008, this best motion vector for hypothetical interpolated frame(t−$\frac{1}{2}$) 1006 is scaled by the relative distance of the actual interpolated frames, frame(t−$\frac{2}{3}$) 1004 and frame (t−$\frac{1}{3}$) 1008, from the reference (either frame(t−1) 1002 and frame(t) 1010). This results in a perception of smoother motion without jitter when compared to the process where a candidate list is created for each block in each of the actual interpolated frames. This process also has the added advantage of being computationally less expensive, as the complexity of motion vector selection does not scale with the number of frames being interpolated because a single candidate list is constructed.

Other embodiments can be developed to accommodate a diverse set of platforms with different computational resources (e.g., processing power, memory, etc.). For example in FIG. 11, one embodiment is shown for block 304 of FIG. 3 where the best motion vector is selected for each block of the interpolated frame. This embodiment in FIG. 11 uses the block motion vectors from a compressed bitstream to making the determination of which motion vector is best, thereby eliminating the motion estimation process. Many block motion compensated video compression algorithms such as H.261, H.263 and H.263+ generate block (and macroblock) motion vectors that are used as part of the temporal prediction loop and encoded in the bitstream for the decoders use. ITU Telecom, Standardization Sector of ITU, *Video Codec for Audiovisual Services at p×64 kbits/s*, Draft ITU-T Recommendation H.261, 1993; ITU Telecom, Standardization Sector of ITU, *Video Coding for Low Bitrate Communication*, ITU-T Recommendation H.263, 1996; ITU Telecom, Standardization Sector of ITU, *Video Coding for Low Bitrate Communication*, Draft ITU-T Recommendation H.263 Version 2, 1997 (i.e., H.263+). Typically, the motion vectors are forward motion vectors; however both backward motion vectors and forward motion vectors may be used for temporal scalability. In one embodiment the encoded vectors are only forward motion vectors. In this embodiment, the block size used for motion estimation is determined by the encoder, thereby eliminating the block selection module. For example, H.263+ has the ability to use either 8×8 blocks or 16×16 macroblocks for motion estimation and the encoder chooses one of these blocks using some encoding strategy to meet data rate and quality goals. The block size is available from header information encoded as part of each video frame. This block size is used in both the candidate list construction and failure prediction.

A consequence of using motion vectors encoded in the bitstream is that during frame interpolation the motion vector selector cannot use the MAD to overlap ratios since the bitstream does not contain information about MADs associated with the transmitted motion vectors. Instead, the motion vector selection process for each block in the interpolated frame chooses the candidate bitstream motion vector with the maximum overlap. The zero motion vector candidate is excluded from the candidate list.

Figure 11:
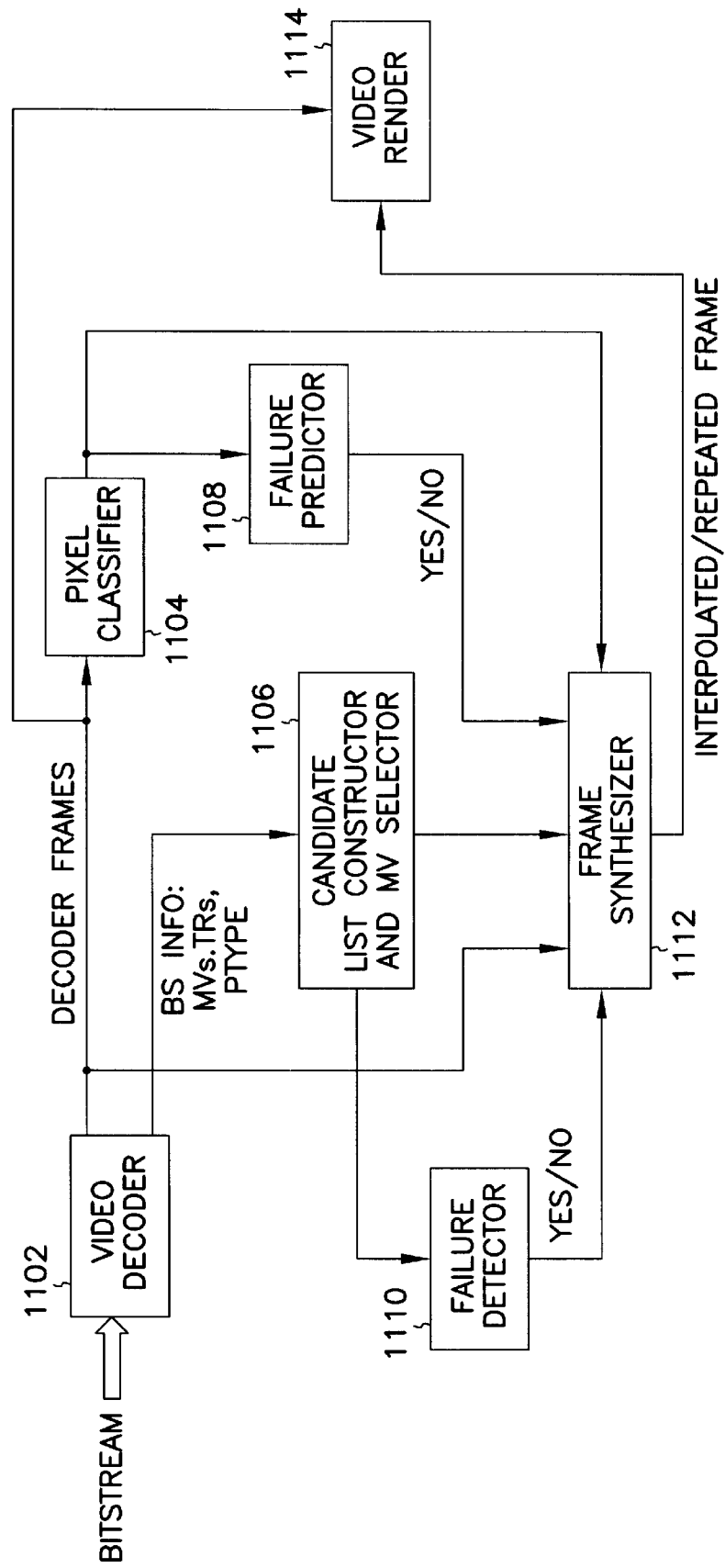
FIG. 11 is a flowchart of a method for using the block motion vectors from a compressed bitstream in determining the best motion vector.

Still referring to FIG. 11, in block 1102, the video sequence is decoded. As in previous embodiments, the frames are sent to block 1104 for classifying the pixels in the current frame. Additionally the bitstream information including the motion vectors and their corresponding characteristics is forwarded to block 1106 to construct the candidate lists and to thereby select the best motion vector. Blocks 1108, 1110 and 1112 demonstrate how predicting interpolation failures, detecting interpolation failure and synthesizing of interpolated frames, respectively, are still incorporated in the embodiment of FIG. 11 as previously described in other embodiments of FIGS. 3 and 9. In block 1114, the video sequence is rendered.

In this embodiment due to the use of encoded motion vectors, the issue must be addressed of how to handle the situation of what happens when the motion information is not available in the bitstream. This situation can arise when a frame is encoded without temporal prediction (INTRA coded frame) or individual macroblocks in a frame are encoded without temporal prediction. In order to account for these cases, it is necessary to make some assumptions about the encoding strategy that causes frames (or blocks in a frame) to be INTRA coded.

Excessive use of INTRA coded frames (or a significant number of INTRA coded blocks in a frame) is avoided because INTRA coding is, in general, less efficient (in terms of bits) than motion compensated (INTER) coding. The situations where INTRA coding at the frame level is either more efficient and/or absolutely necessary are (1) the temporal correlation between the previous frame and the current frame is low (e.g., a scene change occurs between the frames); and (2) the INTRA frame is specifically requested by the remote decoder as the result of the decoder attempting to (a) initialize state information (e.g., a decoder joining an existing conference) or (b) re-initialize state information following bitstream corruption by the transmission channel (e.g., packet loss over the Internet or line noise over telephone circuits).

The situations that require INTRA coding at the block level are analogous with the additional scenario introduced by some coding algorithms such as H.261 and H.263 that require macroblocks to be INTRA coded at a regular interval (e.g., every 132 times a macroblock is transmitted). Moreover, to increase the resiliency of a bitstream to loss or corruption, an encoder may choose to adopt an encoding strategy where this interval is varied depending upon the loss characteristics of the transmission channel. It is assumed that a frame is INTRA coded only when the encoder determines the temporal correlation between the current and the previous frame to be too low for effective motion compensated coding. Therefore in that situation, no interpolated frames are synthesized in block 1112 of FIG. 11, rather the previous frame is repeated by block 1114 using the decoded frame coming from block 1102 directly.

Figure 12:
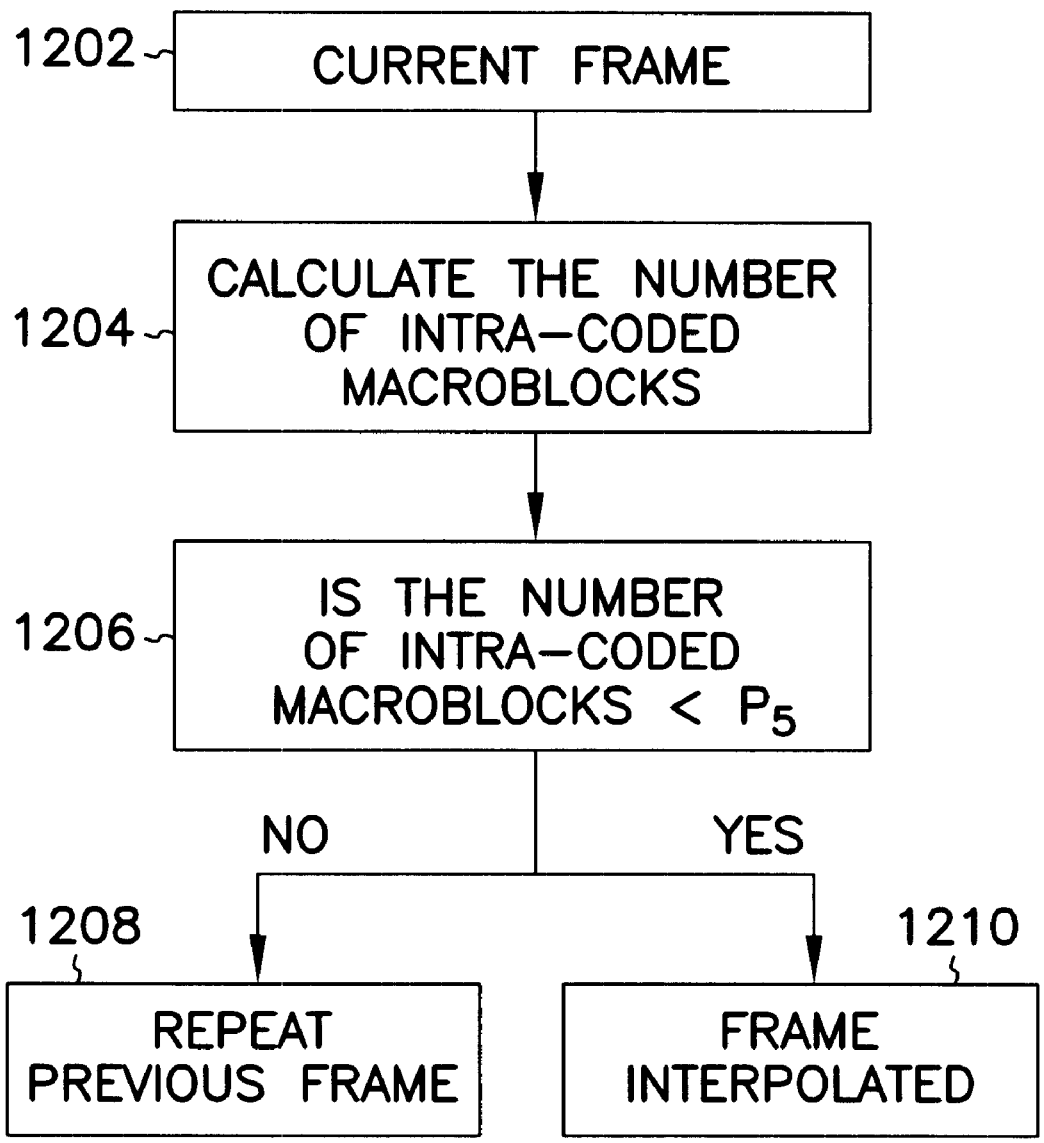
FIG. 12 is a flowchart of a method for determining whether to perform frame interpolation for the embodiment of the invention FIG. 10 when the current frame is not INTRA coded but has a non-zero number of INTRA coded macroblocks.

In FIG. 12, in one embodiment where the current frame is not INTRA coded but has a non-zero number of INTRA coded macroblocks, the relative proportion of such macroblocks determines whether frame interpolation will be pursued. In block 1204 the number of INTRA coded macroblocks is calculated for current frame 1202. In block 1206 a determination is made as to whether the number of INTRA coded macroblocks is less than a predetermined threshold, $P_5$. In block 1208 upon determining that the number of INTRA coded macroblocks is greater than a predetermined threshold, $P_5$, the previous frame is repeated. In block 1210 upon determining that the number of INTRA coded macroblocks is less than a predetermined threshold, $P_5$, frame interpolation is performed.

In block 1210, frame interpolation is pursued with a number of different embodiments for the INTRA coded macroblocks which do not have motion vectors. The first embodiment is to use zero motion vectors for the INTRA coded macroblocks and optionally consider all pixel blocks in this block to belong to the uncovered class. The rationale behind this embodiment is that if indeed the macroblock was INTRA coded because a good prediction could not be found, then the probability of the macroblock containing covered or uncovered pixels is high.

Another embodiment of frame interpolation 1210 is to synthesize a motion vector for the macroblock from the motion vectors of surrounding macroblocks by using a 2-D separable interpolation kernel that interpolates the horizontal and vertical components of the motion vector. This method assumes that the macroblock is a part of a larger object undergoing translation and that it is INTRA coded not due to the lack of accurate prediction but due to a request from the decoder or as part of a resilient encoding strategy.

Another embodiment of frame interpolation 1210 uses a combination of the above two embodiments with a mechanism to decide whether the macroblock was INTRA coded due to poor temporal prediction or not. This mechanism can be implemented by examining the corresponding block in the state classification map; if the macroblock has a predominance of covered and/or uncovered pixels, then a good prediction cannot be found for that macroblock in the previous frame. If the classification map implies that the macroblock in question would have had a poor temporal prediction, the first embodiment of using zero motion vectors for the INTRA coded macroblocks is selected; otherwise the second embodiment of synthesizing a motion vector is chosen. This third embodiment of frame interpolation 1210 is more complex than either of the other two above-described embodiments and is therefore a preferred embodiment if the number of INTRA coded macroblocks is small (i.e., the predetermined threshold for the number of INTRA coded macroblocks in a frame is set aggressively).

In other embodiments, motion estimation uses the classification map to determine the candidate blocks for compensation and a suitable block matching measure (e.g., weighted SADs using classification states to exclude unlikely pixels). In another embodiment, there is a variable block size selection within a frame to improve the granularity of the motion field in small areas undergoing motion.

Figure 13:
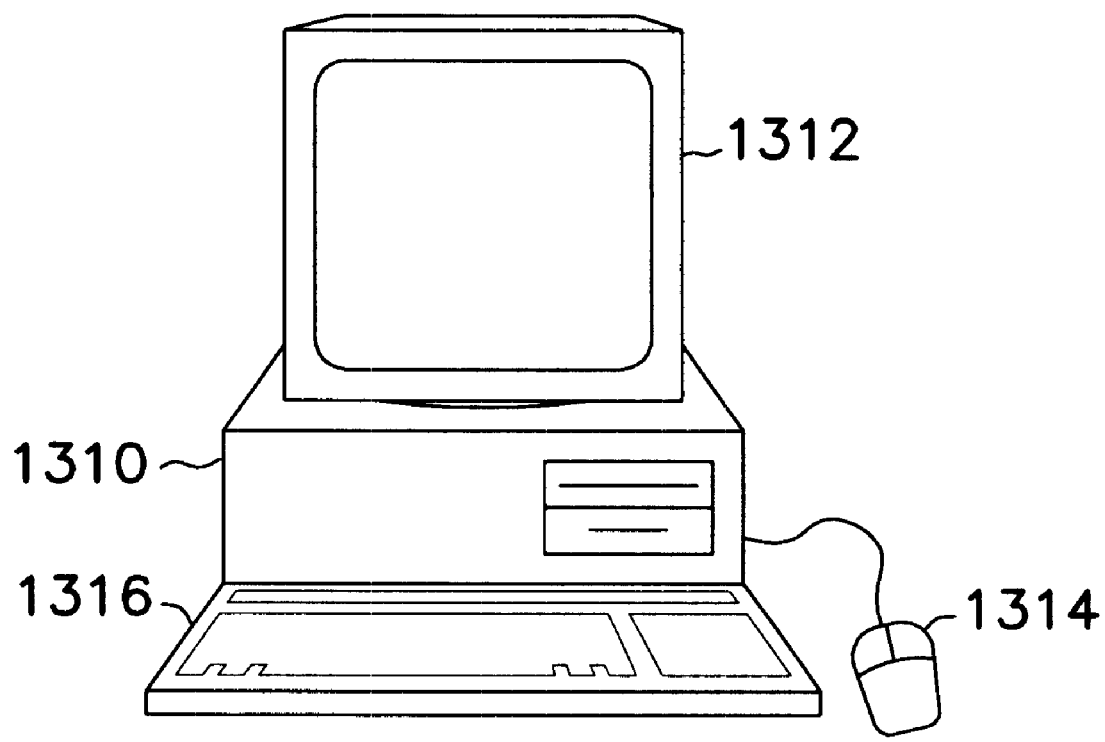
FIG. 13 is a diagram of a computer in conjunction with which embodiment of the invention may be practiced.

Referring finally to FIG. 13, a diagram of a representative computer in conjunction with which embodiments of the invention may be practiced is shown. It is noted that embodiments of the invention may be practiced on other electronic devices including but not limited to a set-top box connected to the Internet. Computer 1310 is operatively coupled to monitor 1312, pointing device 1314, and keyboard 1316. Computer 1310 includes a processor, random-access memory (RAM), read-only memory (ROM), and one or more storage devices, such as a hard disk drive, a floppy disk drive (into which a floppy disk can be inserted), an optical disk drive, and a tape cartridge drive. The memory, hard drives, floppy disks, etc., are types of computer-readable media. The invention is not particularly limited to any type of computer 1310. Residing on computer 1310 is a computer readable medium storing a computer program which is executed on computer 1310. Frame interpolation performed by the computer program is in accordance with an embodiment of the invention.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is manifestly intended that this invention be limited only by the following claims and equivalents thereof.

What is claimed is:

1. A method comprising:
selecting a number of blocks of a frame pair;
synthesizing an interpolated frame based on the selected blocks of the frame pair; and
aborting the synthesis of the interpolated frame upon determining the interpolated frame has an unacceptable quality.

2. A method comprising:
selecting a block size based on a level of activity for a current frame and a previous frame; and
synthesizing an interpolated frame based on the selected block size of the current frame and the previous frame.

3. The method of claim 2 wherein selecting a block size based on a level of activity for a current frame and a previous frame comprises selecting a variable block size within a frame based on the level of activity for the current frame and the previous frame.

4. The method of claim 2 wherein selecting the block size based on the level of activity for the current frame and the previous frame comprises determining proportions of a number of pixels in the current frame belonging to a number of certain classes.

5. The method of claim 4 wherein determining proportions of the number of pixels in the current frame belonging to the number of certain classes comprises:
(a) selecting an initial block size of N×N, wherein N is a block size variable;
(b) determining relative proportions of pixels for each block that belong to a certain class;
(c) determining the number of blocks that have a single class of pixels in excess of a first predetermined threshold to form a homogenous value;
(d) comparing the homogenous value to a second predetermined threshold;
(e) using block size N×N wherein N is the block size variable upon determining the homogenous value is greater than the second predetermined threshold; and
(f) dividing the block size variable by two and repeating (b)–(e) until the homogenous value is in excess of the second predetermined threshold or the block size variable is less than a third predetermined threshold.

6. A method comprising:
selecting a zero motion vector for a given pixel in an interpolated frame upon determining a current pixel in a current frame corresponding to the given pixel in the interpolated frame is classified as covered or uncovered; and
synthesizing the interpolated frame based on selecting the zero motion vector for the given pixel in the interpolated frame upon determining the current pixel in the current frame corresponding to the given pixel in the interpolated frame is classified as covered or uncovered.

7. A method comprising:
classifying a number of pixels in a current frame into one of a number of different pixel classifications for synthesis of an interpolated frame; and
aborting of the synthesis of the interpolated frame and repeating a previous frame upon determining the interpolated frame has an unacceptable quality based on the classifying of the number of pixels in the current frame.

8. The method of claim 7 wherein aborting of the synthesis of the interpolated frame and repeating the previous frame upon determining the interpolated frame has the unacceptable quality based on the classifying the number of pixels in the current frame comprises aborting of the synthesis of the interpolated frame and repeating the previous frame upon determining a number of covered and uncovered pixels in the current frame exceeded a predetermined threshold.

9. A method comprising:
selecting a best motion vector from a forward motion vector, a backward motion vector, and a zero motion vector for each of a number of blocks for a hypothetical interpolated frame situated temporally in between a current frame and a previous frame;
scaling the best motion vector for each of the number of blocks for the hypothetical interpolated frame for a number of interpolated frames a relative distance of the number of interpolated frames from the current frame; and
synthesizing the number of interpolated frames based on the best motion vector for each block within the number of interpolated frames.

10. A method comprising:
determining a suitable block matching measure for motion compensation, the block matching measure including a block matching error and an overlap; and
synthesizing an interpolated frame based on the suitable block matching measure.

11. A system comprising:
a block size selector selecting a number of blocks of a frame pair;
a synthesizer synthesizing an interpolated frame based on the selected blocks of the frame pair; and
a mechanism aborting the synthesis of the interpolated frame upon determining the interpolated frame has an unacceptable quality.

12. The system of claim 11 further comprising a video display, wherein the video display receives the frame pair and the interpolated frame from the synthesizer to display the frame pair and the interpolated frame.

13. A system comprising:
a block size selector selecting a block size based on a level of activity for a current frame and a previous frame; and
a synthesizer synthesizing an interpolated frame based on the selected block size of the current frame and the previous frame.

14. A system comprising:
a first mechanism maintaining a number of lists for a number of interpolated blocks of an interpolated frame for determining a best-matched block from a current frame and a previous frame for each interpolated block, wherein each list of the number of lists has a current winning block;
a block size selector selecting the best-matched block for each interpolated block from the current winning block for each list based on an error criterion and an overlap criterion; and
a synthesizer synthesizing the interpolated frame based on the best-matched block for each interpolated block.

15. The system of claim 14 wherein the selection of the best-matched block by the block size selector based on the error criterion and the overlap criterion comprises selection of the best-matched block whose ratio of a block matching error to a corresponding overlap is smallest.

16. The system of claim 15 further comprising:
a second mechanism substituting a zero motion vector for a best motion vector for creation of each interpolated block of the interpolated frame upon determining the corresponding overlap is less than a first predetermined threshold; and a third mechanism aborting the synthesis of the interpolated frame and repeating a previous frame upon determining a number of interpolated blocks whose corresponding overlap is less than a first predetermined threshold is greater than a second predetermined threshold.

17. A system comprising:
a mechanism selecting a zero motion vector for a given pixel in an interpolated frame upon determining a current pixel in a current frame corresponding to the given pixel in the interpolated frame is classified as covered or uncovered; and
a synthesizer synthesizing the interpolated frame based on the selection of the zero motion vector for the given pixel in the interpolated frame upon determining the current pixel in the current frame corresponding to the given pixel in the interpolated frame is classified as covered or uncovered.

18. A system comprising:
a first mechanism classifying a number of pixels in a current frame into one of a number of different pixel classifications for synthesis of an interpolated frame; and
a second mechanism aborting the synthesis of the interpolated frame and repeating a previous frame upon determining the interpolated frame has an unacceptable quality based on the classification of the number of pixels in the current frame.

19. A system comprising:
a block size selector selecting a best motion vector for each of a number of blocks for a hypothetical interpolated frame situated temporally in between a current frame and a previous frame;
a mechanism scaling the best motion vector for each of the number of blocks for the hypothetical interpolated frame for a number of interpolated frames a relative distance of the number of interpolated frames from the current frame; and
a synthesizer synthesizing the number of interpolated frames based on the best motion vector for each block within the number of interpolated frames.

20. An article comprising a computer readable medium having a computer program stored thereon for execution on a computer with instructions to:
select a block size based on a level of activity for a current frame and a previous frame; and
synthesize an interpolated frame based on the selected block size of the current frame and the previous frame.

21. The method of claim 1, wherein determining the interpolated frame has an unacceptable quality further comprises:
determining that a sum of relative portions of covered and uncovered pixels within a block exceeds a first predetermined threshold.

22. The method of claim 21, wherein determining the interpolated frame has an unacceptable quality further comprises:
determining that a sum of relative portions of covered and uncovered pixels within an other block exceeds the first predetermined threshold;
marking the block and the other block as suspect; and
determining the a number of blocks marked as suspect exceeds a second predetermined threshold.

23. The method of claim 2, wherein selecting a block size further comprises:
dynamically changing the block size on a per-frame basis.

24. The method of claim 23, wherein selecting a block size further comprises:
changing a resolution of a motion field to account for both large and small amounts of motion.

25. The method of claim 6, further comprising:
determining a number of pixels in the current frame to be covered or uncovered.

26. The method of claim 25, further comprising:
low-pass filtering an edge of a covered region.

27. The method of claim 7, wherein determining the interpolated frame has an unacceptable quality further comprises:
determining that a number of non-stationary blocks in the interpolated frame have been forced to use a zero motion vector.

28. The method of claim 27, wherein determining the interpolated frame has an unacceptable quality further comprises:
determining that the number of non-stationary blocks exceeds a predetermined proportion of all blocks in the interpolated frame.

29. The method of claim 9, further comprising:
creating a candidate list for each block in the number of blocks.

30. The method of claim 29, wherein the candidate list includes the forward motion vector, the backward motion vector, and the zero motion vector.

31. The method of claim 10, wherein the block matching error includes a sum of absolute difference.

32. The method of claim 10, wherein the block matching error includes a mean absolute difference.

33. The method of claim 32, further comprising:
calculating a ratio comprising the mean absolute difference and the overlap; and
comparing the ratio to a predetermined threshold.

34. The system of claim 11, wherein determining the interpolated frame has an unacceptable quality includes determining that a sum of relative portions of covered and uncovered pixels within a block exceeds a predetermined threshold.

35. The system of claim 13, wherein selecting a block size includes dynamically changing the block size on a per-frame basis.

36. The system of claim 13, wherein selecting a block size includes changing a resolution of a motion field to account for both large and small amounts of motion.

37. The system of claim 17, further comprising:
a mechanism to calculate the zero motion vector capable of being coupled to the mechanism selecting a zero motion vector.

38. The method of claim 23, further comprising:
a video display, wherein the video display receives the current frame and the interpolated frame from the synthesizer to display the current frame and the interpolated frame.

39. The system of claim 18, wherein determining the interpolated frame has an unacceptable quality includes marking blocks having a sum of relative portions of covered and uncovered pixels exceeding a predetermined threshold as suspect.

40. The method of claim 39, wherein the number of different pixel classifications includes covered, uncovered, moving, and stationary.

41. The system of claim 19, further comprising:
a classification map having a state for each one of a plurality of pixels, the classification map being accessible by the block size selector.

42. The system of claim 41, wherein the classification map has a number of different pixel classifications including covered, uncovered, moving, and stationary.

* * * * *

UNITED STATES PATENT AND TRADEMARK OFFICE
CERTIFICATE OF CORRECTION

| | | |
|---|---|---|
| PATENT NO. | : 6,594,313 B1 | Page 1 of 1 |
| APPLICATION NO. | : 09/221666 | |
| DATED | : July 15, 2003 | |
| INVENTOR(S) | : Hazra et al. | |

It is certified that error appears in the above-identified patent and that said Letters Patent is hereby corrected as shown below:

In column 13, line 59, in Claim 22, delete "a" after "the".

Signed and Sealed this

Sixteenth Day of January, 2007

JON W. DUDAS
*Director of the United States Patent and Trademark Office*